US006808767B2

(12) United States Patent
Schliesman

(10) Patent No.: US 6,808,767 B2
(45) Date of Patent: Oct. 26, 2004

(54) HIGH GLOSS INK JET RECORDING MEDIA

(75) Inventor: Leonard J. Schliesman, Wisconsin Rapids, WI (US)

(73) Assignee: Stora Enso North America Corporation, Wisconsin Rapids, WI (US)

( * ) Notice: Subject to any disclaimer, the term of this patent is extended or adjusted under 35 U.S.C. 154(b) by 22 days.

(21) Appl. No.: 09/838,480

(22) Filed: Apr. 19, 2001

(65) Prior Publication Data

US 2004/0076772 A1 Apr. 22, 2004

(51) Int. Cl.$^7$ ................................. B41M 5/00
(52) U.S. Cl. ............................. 428/32.24; 428/32.25; 428/32.28; 428/32.3; 428/32.35; 428/32.38
(58) Field of Search ................................. 428/195, 206, 428/213, 219, 325, 341, 32.24, 32.25, 32.28, 32.3, 32.35, 32.38

(56) References Cited

U.S. PATENT DOCUMENTS

| | | | |
|---|---|---|---|
| 3,298,030 A | 1/1967 | Lewis et al. | |
| 3,415,671 A | 12/1968 | Rice | |
| 3,523,818 A | 8/1970 | Blumenthal | |
| 3,535,202 A | 10/1970 | Huang | |
| 3,615,549 A | 10/1971 | Ohyama et al. | |
| 3,655,527 A | 4/1972 | Curran et al. | |

(List continued on next page.)

FOREIGN PATENT DOCUMENTS

| | | | |
|---|---|---|---|
| DE | 3151471 | 8/1982 | |
| EP | 439153 A | 7/1991 | |
| EP | 493100 A1 | 7/1992 | |
| EP | 00730976 | 9/1996 | |
| EP | 743193 A1 | 11/1996 | |
| EP | 803374 A2 | 10/1997 | |
| EP | 968836 A2 | 1/2000 | |
| EP | 1002657 A1 | 5/2000 | |
| EP | 1050413 | 11/2000 | ............ B41M/5/00 |
| EP | 888904 B1 | 3/2001 | |
| EP | 1127708 | 8/2001 | ............ B41M/5/00 |
| GB | 2129333 B | 11/1986 | |
| GB | 2334684 A | 9/1999 | |
| JP | 51-47340 | 12/1976 | |
| JP | 52-74340 | 3/1977 | |
| JP | 55-051583 | 4/1980 | |
| JP | 56-148583 | 11/1981 | |
| JP | 56-148586 | 11/1981 | |
| JP | 56-082085 | 5/1982 | |
| JP | 57-107878 | 7/1982 | |
| JP | 57-107879 | 7/1982 | |
| JP | 57-157586 | 9/1982 | |
| JP | 58-094491 | 6/1983 | |
| JP | 1160674 | 6/1989 | |
| JP | 03295078 | 10/1991 | |
| JP | 07164383 | 6/1995 | |
| JP | 8072387 | 3/1996 | |
| JP | 09272257 | 10/1997 | |
| WO | WO 95/00340 | 1/1995 | |

OTHER PUBLICATIONS

Ralph K. Iler. *Silica Gels and Powders.* "The Chemistry of Silica Solubility, Polymerization, Colloid and Surface Properties, and Biochemistry," Ed. John Wiley & Sons; 5 (462–621) 1979.
*Technical Bulletin No. 105.* "Stickies and Pitch Pacification White Paper Grades; Kenite®; Celite®; Harborlite®." Ed. World Minerals Inc.; 1980.
*Hercules.* "Hercon 70, 72, 75, and 78 Cationic Emulsions, The Next Generation of Alkaline Sizing Agents." Ed. Hercules, Inc; Dec. 1989.
Masao Takahashi, Teiji Sato and Masahide Ogawa; Research and Development Division *"Development of Amorphous Silica for Ink Jet Recording Paper."* Ed. Mizusawa Industrial Chemicals, Ltd.; Apr. 23, 1990.
*Paper Chemical Products & Services.* "Lectrapel Anti––Static Agent." Ed. Calgon Corporation, Water Management Divison; Dec. 1992.
"Basoplast® 335 D"; BASF Corporation; Jun. 1994.
*Hercules.* "Chromaset™ 600 Surface Sizing Treatment." Ed. Hercules, Inc.; Nov. 1994.
*Air Products and Chemicals.* "Airvol® Polyvinyl Alcohol Typical Properties." Ed. Air Products and Chemicals, Inc. 1995.
Martifin OL/107; May 1995.
"Polyox® Water–Soluble Resins".
Micahel C. Wilthiam. Silica Pigments for ink Jet Printablility; Presented at the 1996 TAPPI Coating Conference, Nashville, TN, May 21, 1996.
"Kirk–Othmer Encyclopedia of Chemical Technology." Recycling, Oil to Silicon. Ed.John Wiley & Sons; Fourth Edition; vol. 21.
*CIBA–GEIGY Technical Bulletin.* "Fluorescent Whitening Agents for Paper."

(List continued on next page.)

Primary Examiner—Cynthia H. Kelly
Assistant Examiner—B. Shewareged
(74) Attorney, Agent, or Firm—Greer, Burns & Crain, Ltd.

(57) ABSTRACT

High gloss ink jet recording media are produced without need for calendering or supercalendering. The media are comprised of a substrate, such as paper, an ink carrier vehicle absorptive coating on the substrate and an ink-receptive coating overlying the absorptive coating. The absorptive coating is made up in major part of a pigment component that is comprised in major part, i.e., 60–100%, and preferably 100%, of calcined clay. The absorptive coating is applied to the substrate at a thickness sufficient to provide a smooth and level surface. The ink receptive coating is porous and made up of constituents that provide requisite ink holdout and print quality functions and that, when applied to the absorptive coating, also provide a high gloss print surface without calendering or supercalendering. The recording media have exceptionally quick ink drying times and provide excellent high-gloss print quality.

16 Claims, No Drawings

U.S. PATENT DOCUMENTS

| | | |
|---|---|---|
| 3,715,219 A | 2/1973 | Kurz et al. |
| 3,759,744 A | 9/1973 | Schliesman |
| 3,889,270 A | 6/1975 | Hoffmann et al. |
| 3,966,572 A | 6/1976 | Carder |
| 4,102,845 A | 7/1978 | Schröder et al. |
| 4,118,245 A * | 10/1978 | Hamill et al. ........... 106/288 B |
| 4,151,666 A | 5/1979 | Raphael et al. |
| 4,168,165 A | 9/1979 | Kato et al. |
| 4,168,338 A | 9/1979 | Kato et al. |
| 4,266,016 A | 5/1981 | Date et al. |
| 4,330,605 A | 5/1982 | Boston |
| 4,371,582 A | 2/1983 | Sugiyama et al. |
| 4,425,405 A | 1/1984 | Murakami et al. |
| 4,440,827 A | 4/1984 | Miyamoto et al. |
| 4,446,174 A | 5/1984 | Maekawa et al. |
| 4,460,637 A | 7/1984 | Miyamoto et al. |
| 4,474,847 A | 10/1984 | Schröder et al. |
| 4,474,850 A | 10/1984 | Burwasser |
| 4,474,859 A | 10/1984 | Oshima et al. |
| 4,478,910 A | 10/1984 | Oshima et al. |
| 4,490,434 A | 12/1984 | Oshima et al. |
| 4,542,059 A | 9/1985 | Toganoh et al. |
| 4,554,181 A | 11/1985 | Cousin et al. |
| 4,564,560 A | 1/1986 | Tani et al. |
| 4,576,867 A | 3/1986 | Miyamoto |
| 4,620,197 A | 10/1986 | Miyamoto et al. |
| 4,636,409 A | 1/1987 | Arai et al. |
| 4,642,654 A | 2/1987 | Toganoh et al. |
| 4,732,786 A | 3/1988 | Patterson et al. |
| 4,743,507 A | 5/1988 | Franses et al. |
| 4,758,461 A | 7/1988 | Akiya et al. |
| 4,780,356 A | 10/1988 | Otouma et al. |
| 4,792,487 A | 12/1988 | Schubring et al. |
| 4,877,678 A | 10/1989 | Hasegawa et al. |
| 4,877,686 A | 10/1989 | Riou et al. |
| 4,879,166 A | 11/1989 | Misuda et al. |
| 4,892,787 A | 1/1990 | Kruse et al. |
| 4,900,620 A | 2/1990 | Tokita et al. |
| 4,902,568 A | 2/1990 | Morohoshi |
| 4,915,923 A | 4/1990 | Ogawa et al. |
| 4,931,810 A | 6/1990 | Iwata et al. |
| 5,013,603 A | 5/1991 | Ogawa et al. |
| 5,022,924 A * | 6/1991 | Raythatha et al. .......... 106/486 |
| 5,041,328 A | 8/1991 | Akiya et al. |
| 5,057,570 A | 10/1991 | Miller et al. |
| 5,081,470 A | 1/1992 | Kurabayashi et al. |
| 5,124,201 A | 6/1992 | Kurabayashi et al. |
| 5,180,624 A | 1/1993 | Kojima et al. |
| 5,213,873 A | 5/1993 | Yasuda et al. |
| 5,266,397 A | 11/1993 | Ogawa et al. |
| 5,270,103 A | 12/1993 | Oliver et al. |
| 5,279,885 A | 1/1994 | Ohmori et al. |
| 5,302,437 A | 4/1994 | Idei et al. |
| 5,314,747 A | 5/1994 | Malhotra et al. |
| 5,320,897 A | 6/1994 | Kondo et al. |
| 5,397,619 A | 3/1995 | Kuroyama et al. |
| 5,405,678 A * | 4/1995 | Bilodeau ................... 428/211 |
| 5,437,925 A | 8/1995 | Macaulay et al. |
| 5,443,909 A * | 8/1995 | Mandoh et al. ........ 428/402.21 |
| 5,459,502 A | 10/1995 | Sakaki et al. |
| 5,463,178 A | 10/1995 | Suzuki et al. |
| 5,472,757 A | 12/1995 | Ogawa et al. |
| 5,478,631 A | 12/1995 | Kawano et al. |
| 5,605,750 A | 2/1997 | Romano et al. |
| 5,660,622 A | 8/1997 | Nikoloff |
| 5,660,928 A | 8/1997 | Stokes et al. |
| 5,670,242 A * | 9/1997 | Asano et al. ............... 428/212 |
| 5,700,582 A | 12/1997 | Sargeant et al. |
| 5,702,804 A | 12/1997 | Malhotra |
| 5,709,976 A | 1/1998 | Malhotra |
| 5,725,946 A | 3/1998 | Fukushima et al. |
| 5,747,146 A | 5/1998 | Kashiwazaki et al. |
| 5,755,929 A | 5/1998 | Kuroyama et al. |
| 5,798,173 A | 8/1998 | Momma et al. |
| 5,804,293 A * | 9/1998 | Nehmsmann et al. .... 428/307.3 |
| 5,846,647 A | 12/1998 | Yoshino et al. |
| 5,851,654 A | 12/1998 | Yoshino et al. |
| 5,856,001 A | 1/1999 | Okumura et al. |
| 5,856,023 A | 1/1999 | Chen et al. |
| 5,863,648 A | 1/1999 | Ohmura et al. |
| 5,866,268 A | 2/1999 | Sargeant et al. |
| 5,869,177 A | 2/1999 | Yoshino et al. |
| 5,882,388 A | 3/1999 | Adair et al. |
| 5,882,396 A | 3/1999 | Hiorns |
| 5,882,754 A | 3/1999 | Kuroyama et al. |
| 5,882,755 A | 3/1999 | Igarashi et al. |
| 5,888,635 A | 3/1999 | Yang et al. |
| 5,897,961 A | 4/1999 | Malhotra et al. |
| 5,916,673 A | 6/1999 | Fryberg et al. |
| 5,928,765 A | 7/1999 | Malhotra |
| 5,928,787 A | 7/1999 | Owatari et al. |
| 5,928,988 A | 7/1999 | Yamane et al. |
| 5,942,335 A | 8/1999 | Chen et al. |
| 5,952,082 A | 9/1999 | Normington et al. |
| 5,962,128 A | 10/1999 | Kuroyama |
| 5,965,244 A | 10/1999 | Tang et al. |
| 5,985,424 A | 11/1999 | DeMatte et al. |
| 5,997,626 A * | 12/1999 | Wu et al. ................... 106/486 |
| 6,010,790 A | 1/2000 | Chen et al. |
| 6,028,028 A | 2/2000 | Nitta |
| 6,037,050 A | 3/2000 | Saito et al. |
| 6,074,793 A | 6/2000 | Camp et al. |
| 6,129,785 A | 10/2000 | Schliesman et al. |
| 6,140,406 A | 10/2000 | Schliesman et al. |
| 6,165,606 A * | 12/2000 | Kasahara et al. ........... 428/323 |
| 6,242,082 B1 * | 6/2001 | Mukoyoshi et al. ........ 428/212 |
| 6,335,306 B1 * | 1/2002 | Segawa et al. ............. 503/201 |
| 6,346,313 B1 * | 2/2002 | Cook ......................... 428/195 |
| 6,465,086 B1 * | 10/2002 | Kitamura et al. ........... 428/212 |

OTHER PUBLICATIONS

*CIBA–GEIGY Technical* Bulletin. "Tinopal HST Liquid."
*CIBA–GEIGY Technical Bulletin.* "Tinopal SCP Liquid."
*Paper Chemicals.* MSA–150 Surface Size. Ed. Morton® Water Based Polymers.
*Davison Silica Gels.* "Typical Chemical and Physical Properties of Silica Gel."
"*UniQ–Print® 8000 Unique Printability Enhancer*" Sequa Chemicals, Inc. Ed. Sequa Chemicals, Inc.
D.M. Chapman, Ph.D. "Silica–Gel Coatings for Ink–Jet Media." Ed. Grace Davison.
"*The Davison Family of Syloid® Silicas.* "Ed. Grace Davison Chemical.
"Introduction to Silica Gel."
"*Acronal® PR 8689 X*". Ed. BASF Corporation. Aug. 1995.

* cited by examiner

HIGH GLOSS INK JET RECORDING MEDIA

FIELD OF THE INVENTION

The invention relates to ink jet recording media having high gloss, and in particular to ink jet recording media providing high gloss without calendering or supercalendering.

BACKGROUND OF THE INVENTION

High quality ink jet recording media are typically made by applying a single layer of coating to a substrate, such as paper or plastic film. The coating is necessarily designed for multi-functionality, e.g., absorption for rapid ink drying, reactivity to hold out ink at the coating surface for maximum print quality, strength for rub-resistance, wet resistance, water fastness, fade-resistance, etc. The coating layer must be applied in an amount sufficient to provide this multi-functionality, and particularly to provide for absorbency of the ink carrier vehicle (usually water) needed for rapid drying time. Typical coat weights are five to eight pounds per functional side per 3300 square feet. Some, but not all, of the functions require expensive coating ingredients.

U.S. Pat. Nos. 4,460,637 and 5,985,424, for example, have suggested that the requisite functionalities might be better or more easily attained by the use of two layers of coating materials having different constituents and different characteristics for serving different purposes. U.S. Pat. No. 5,985,424 in particular proposes use of a first or base coating (which, considering the substrate, may also be referred to as an intermediate layer) designed to have high absorptivity for the ink vehicle and to be compatible in performance with various ink receptive top-coat formulations comprised, in this case, of various ratios of fumed silica and styrene-vinylpyrrolidone. The base coat formulation comprises, by weight, 65–80% precipitated calcium carbonate, 20–30% calcined clay and up to 10% titanium-dioxide, dispersed in a binder comprising 10–15% polyvinyl acetate and 2–5% soy protein.

Calcined clay is significantly different from the clays customarily employed in the coated paper industry, e.g., kaolin clay. Calcined clay has a high surface area and, when applied as a coating and dried, has an open structure providing high void volume. In contrast, conventional clays when dried are comparatively dense with little void volume. Because of its high void volume and large surface area, calcined clay is highly absorbent and would serve well to absorb the ink carrier vehicle. Also, it is much less expensive than other absorbent pigments.

On the other hand, calcined clay is very difficult to work with; it adversely affects coating rheology; and it tends to be abrasive, which can cause rapid wear of converting machinery. Consequently, in the manufacture of ink jet recording media, calcined clay has been relegated to use in minor proportions, if at all.

Whether the substrate is coated with a single layer of coating material or multiple layers of diverse coating materials, if it is desired to have a glossy surface on the recording medium, it is necessary to calender or supercalender either the ink receptive coating or the underlying base sheet. Calendering or supercalendering is necessary to achieve desired gloss or smoothness targets or both. Calendering densifies the medium and leads to a non-porous, and thus non-absorbent, ink-receiving surface. While print quality on these surfaces may be very good, dry times are too long for commercial printing speeds.

OBJECTS OF THE INVENTION

The primary object of the invention is to provide a high-quality, high-gloss ink jet recording medium without need for calendering or supercalendering.

Another object of the invention is to provide a high-quality ink jet recording medium having an ink-receiving or receptor coating such that the final print surface has not only the desired gloss and smoothness, but is also porous to enhance drying time.

A further object of the invention is to provide an ink jet recording medium having a high-gloss, porous ink-receiving coating and an absorptive underlying base coating for rapid absorption of excess ink carrier vehicle and rapid drying of the ink.

A still further object of the invention is to provide a high gloss ink jet recording medium having an absorptive intermediate or undercoating comprised of a pigment component and a binder component wherein the pigment component is comprised in major part, more than 50% by weight, of highly absorbent calcined clay.

SUMMARY OF THE INVENTION

The high quality, high gloss ink jet recording medium of the invention is comprised of a substrate, such as pre-treated or untreated paper or plastic film, an ink vehicle absorptive coating on the substrate and an ink receptive coating overlying the absorptive coating. The absorptive coating is comprised in major part of a pigment component and in minor part of a binder component, and the pigment component is comprised in major part, i.e., 60–100% and preferably 100%, by weight of calcined clay. The absorptive coating is applied to the substrate at a thickness sufficient to provide a smooth and level surface. The ink receptive or receptor coating is comprised of one or more ink receptive constituents that provide the requisite functionalities of ink hold out, print quality, etc., and that, when applied to the absorptive coating, provide a high gloss print surface without calendering or supercalendering. The ink receiving coating preferably also includes one or more porosity-enhancing constituents to speed up drying time.

The key to the product design is the innovative, intermediate coating between the substrate and the gloss receptor coating. This intermediate coating has the unique ability to provide (1) a very smooth surface for the gloss receptor coating, (2) a base for uniform holdout of the receptor coating, and (3) an absorptive under layer for absorbing excess ink carrier vehicle, e.g., water. Additionally, the intermediate layer or coating imparts dimensional stability to the recording medium for the reason that it prevents moisture changes in either the substrate or the receptor coating from affecting the medium as a whole. Also, the intermediate layer permits use of a porous top coat to achieve outstanding improvements in drying time. And most significantly, it facilitates the production of high quality, high gloss ink jet recording media without requiring calendering or supercalendering.

The foregoing and other objects and advantages of the invention will become apparent to those reasonably skilled in the art from the following detailed description.

DETAILED DESCRIPTION OF PREFERRED EMBODIMENTS

The following is a detailed description of preferred embodiments of the invention presently deemed by the inventor to be the best mode of carrying out the invention.

The high gloss ink jet recording medium of the invention is comprised of a substrate, an ink vehicle absorptive coating on the substrate, and an ink receptive coating overlying the absorptive coating.

The substrate may comprise any sheet material customarily employed for ink jet or other printing, such as plastic film or paper. Base papers suitable for the substrate may range in basis weight from 25 to 150 pounds per 3,000-square foot ream and may contain groundwood or be groundwood-free. The paper may be machine glazed (MG) or machine finished (MF) and may be uncoated or prime-coated. If prime coated, a preferred formulation would be comprised of approximately equal proportions of fine ground (FG) calcium carbonate and starch applied to the paper at a coat-weight of about 4 pounds per 3,000 square feet.

The absorptive coating layer is comprised in major part of a pigment component and in minor part of a binder component. The ratio of binder to pigment may be in the order of about 10–25 parts binder per 100 parts pigment. The pigment component is comprised in major part, i.e., 60–100%, and preferably 100%, by weight of calcined clay, which is an economical absorbent. The remainder, if any, may be standard No. 1 clay or any other pigment commonly used in paper coatings, such as hydrous clay or alumina trihydrate.

Improvements in print quality with similar economies can be achieved by using modified calcined clays in lieu of or in combination with standard calcined clays. Standard calcined clays, when used at high levels, adversely affect coating rheology (flow) and cause objectionable abrasiveness in converting operations. Modified calcined clays are available that have low abrasivity, for example, ANSILEX® produced by Engelhard Corporation, Iselin, N.J., and KAOCAL® produced by Thiele Kaolin Company, Sandersville, Ga. Incorporating these products into the absorptive coating, e.g., part-for-part with standard calcined clays, will maintain the ink vehicle absorptivity of the coating without imparting undesirable abrasiveness to the recording medium.

The binder component of the absorptive coating is preferably a multiple-constituent component comprised of 2–6 parts protein or casein, e.g., soy protein, and a sufficient amount of a second binder system to add up to 10–25 parts. The second binder system may comprise polyvinyl alcohol and any standard latex, such as styrene butadiene, styrene acrylic, acrylic or vinyl acrylic. If desired, starch could be used in place of part or all of the polyvinyl alcohol. A preferred ratio is 15 parts styrene butadiene (SBR) latex and 4 parts low molecular weight polyvinyl alcohol. Other binders and minor ingredients commonly used in paper coatings, e.g., lubricants, defoamers, insolublizers, colorants, dispersants, etc., can be used as well. However, in order to facilitate use of high levels of calcined clay in the coating composition, and to obtain a composition having the coating flow properties (rheology) needed for good application, the constituents of the coating composition must be used in certain combinations, amounts and orders of addition, as will presently be described.

The calcined clay in the absorptive coating, in addition to its absorptive quality, imparts to the coating an extremely smooth and level surface. Surface smoothness is also aided by the protein or casein in the binder for the reason that protein and casein impart structure and high bulk to the coating layer. The remainder of the binder system, in addition to its binding function, provides uniform holdout for the ink receptive or receptor coating.

The thickness of the layer of absorptive coating material applied to the substrate must be sufficient to provide a smooth and level surface, but should not exceed about 15 microns in thickness. Coatings with thicknesses greater than 15 microns tend to embrittle the recording medium. A preferred coat weight range is from about 3 to about 8 pounds per 3,000 square feet.

The ink receptive or receptor coating is comprised of ink-receiving constituents that provide the requisite functionalities of ink holdout, print quality, etc., and that, when applied to the absorptive coating, also provide a smooth and high gloss print surface without calendering or supercalendering. Subject to these conditions, the coating can be any combination of water-soluble or water-dispersible polymers (such as polyvinyl alcohol and polyvinylpyrrolidone), ink dye colorants, ink dye mordants and sizing agents. Cationic pigment can also be added as an ink setting agent to absorb ink dyes and reduce fingerprinting. The coating must have sufficient porosity to allow penetration of excess ink carrier vehicle into the underlying absorptive layer. The coat weight can range from about 2 to about 10 pounds per 3,000 square feet per functional side, but the preferred range is 4 to 6 pounds per 3,000 square feet. The preferred range provides the desired gloss and yet is economical.

The ink jet recording medium of the invention thus provides a printing surface having the desired gloss and smoothness and does so without any need for calendering or supercalendering. In addition, the ink receptive coating is porous and has an absorptive undercoating to rapidly absorb excess ink vehicle. Dry times are outstanding. Also, the uncalendered medium of the invention maintains sufficient bulk and stiffness, even at low basis weights, to provide for improved sheet feeding in ink jet printing devices.

The success of the high gloss recording medium of the invention is attributable mainly to the innovative intermediate coating layer having an absorptive pigment component comprised in major part, i.e., more than 50%, and preferably up to 100%, of calcined clay. Calcined clay has not heretofore been used as the major constituent in paper coating compositions for a number of reasons, principally rheological. However, it has recently been discovered that coating compositions utilizing calcined clay as the major pigment constituent, even the sole pigment constituent, can be formulated to provide the flow properties (rheology) needed for good application. This is accomplished by preparing the coating composition in the following manner:

In a coating composition makedown tank, add under agitation the following constituents in the following order:

water, pigments other than calcined clay, if any, protein, casein and/or starch, latex, other additives, such as lubricants and/or insolubilizers, dispersant, calcined clay, PVOH, if required.

The calcined clay may be comprised of a low abrasivity modified calcined clay or a mixture of modified calcined clay and standard calcined clay, for example, a part for part or 50—50 mixture. The calcined clay may be added dry or in the form of a slurry.

If the calcined clay is added dry, it is added near the end of the makedown. If protein, such as soy protein, is in the formulation, and it is preferred that it is, the protein is added as a 15–20% cooked solution just prior to the disperant. The protein acts as a protective colloid for the calcined clay and prevents significant reductions in calcined clay particle size. The disperant is preferably an acrylic disperant, such as DISPEX® N-40 available from Allied Colloids, or a chemically similar disperant. The disperant must be added just prior to the addition of the dry calcined clay and also during the addition of the dry calcined clay. The total dispersant requirement is 0.3–0.4 bone dry parts dispersant to 100 bone dry parts calcined clay. The coating is typically 30–45% solids when the dry calcined clay is added. Final coating solids is 45–50%. The coating solids at no time can exceed 55% solids when calcined clay is present and solids in excess of 52% are tolerable only for short periods, less than 10 minutes, during the makedown process.

Slurry calcined clay can be used in the formulations, but the slurry solids must be 45–51%. Slurry solids cannot exceed 51% or porosity and absorptivity may be lost. The same coating solids constraints that apply to dry calcined clay coating makedowns apply to coatings containing slurry calcined clay as well. The point of addition of slurry calcined clay is less critical than the point of addition for dry. At no time, however, can dry pigments be dispersed in coatings containing slurry calcined clay at solids levels higher than 50%.

Final coating compositions having a solids content of 45–50% provide satisfactory coating rheology. Care should be exercised not to exceed 50% solids. The pigment in the composition may be comprised of from somewhat more than 50% up to 100% calcined clay.

The coating composition may be applied to a substrate by substantially any known coating process or method subject, however, to applying the composition in a much thicker layer than conventional. The final dry absorptive coating provided by the invention should have a thickness in the order of about two microns per pound per ream of the desired coat weight. Thus, for a final coat weight of three pounds per ream, the layer of the calcined clay coating of the invention should be about six microns thick, and for a coat weight of eight pounds per ream should be about sixteen microns thick.

When formulated and applied in the manner above-described, as an intermediate coating between a substrate and a gloss receptor coating, the intermediate coating has the unique ability to provide a very smooth surface for the ink receptor coating, uniform holdout of the receptor coating, and an absorptive under-layer for rapidly absorbing excess ink carrier vehicle. Application thereon of an appropriate gloss receptor coating will thereby provide a smooth, level, fast-drying and high-gloss print surface without need for calendering or supercalendering.

A preferred formulation of a gloss receptor coating for the dual-layer coating of the invention is comprised by weight, in approximate but preferred ratios, of 95.6% PVOH, such as Airvol 805 PVOH available from Air Products Co., 2.4% boric acid, 1.0% immobilizer, preferably BERCEN 2196 glycosol immobilizer available from Bercen Incorporated, and 1.0% of a cationic fixing agent, preferably Conductive Polymer 261LV at 20% solids, available from ECCI International. This gloss coat composition does not require any pigment, but if some pigmentation is desired, the pigment should be comprised of no more than about 10% by weight of silicon dioxide or aluminum oxide having a particle size no greater than about 100 nanometers.

Another suitable formulation for the ink receptor coating comprises in the order of about 100 parts low molecular weight polyvinyl alcohol, about 5 parts conductive polymer, about 10 parts cationic pigment and about 5 parts uncooked native rice starch. In the two formulations, the borax and the starch enhance porosity.

The dual layer coating of the invention provides an excellent ink jet recording medium having high gloss, excellent ink hold-out properties, superb print quality, rapid absorption of ink solvent and rapid drying; all without any calendering or supercalendering.

The objects and advantages of the invention have therefore been shown to be attained in a convenient, practical, economical and facile manner.

While certain preferred embodiments of the invention have been herein described, it is to be appreciated that various changes, rearrangements and modifications may be made therein without departing from the scope of the invention, as defined by the appended claims.

What is claimed is:

1. An uncalendered, high-gloss ink jet recording medium comprising a substrate, an ink vehicle absorptive coating on the substrate and an ink receptive coating overlying the absorptive coating, the absorptive coating comprising a pigment component and a binder component wherein the pigment component is comprised by weight of from 60 to 100% calcined clay and provides a smooth and level surface;

the receptive coating comprising polyvinyl alcohol, a cationic fixing agent and a porosity enhancing constituent coated on said smooth and level surface;

said coatings providing high surface gloss without calendering.

2. A recording medium as set forth in claim 1 wherein the calcined clay is comprised in part of modified calcined clay having low abrasivity.

3. A recording medium as set forth in claim 2 wherein the binder component of the absorptive coating is present in the ratio of from about 10 to about 25 parts per 100 parts of the pigment component and is comprised of from about 2 to about 6 parts of protein and/or casein and from about 10 to about 20 parts of latex, starch and/or polyvinyl alcohol.

4. A recording medium as set forth in claim 3 wherein the binder component of the absorptive coating is comprised of from about 2 to about 6 parts protein, about 15 parts latex and about 4 parts low molecular weight polyvinyl alcohol.

5. A recording medium as set forth in claim 1 wherein the absorptive coating is applied to the substrate at a coat weight of from about 3 to about 8 pounds per 3,000 square feet and the receptive coating is applied over the absorptive coating at a coat weight of from about 2 to about 10 pounds per 3,000 square feet.

6. An uncalendered, high-gloss ink jet recording medium comprising a substrate, an ink vehicle absorptive coating on the substrate and an ink receptive coating overlying the absorptive coating, the absorptive coating comprising a pigment component and a binder component wherein the pigment component is comprised by weight of from 60 to 100% calcined clay and provides a smooth and level surface;

the receptive coating comprising a combination of water-soluble or water-dispersible polymers, dye colorants and dye mordants;

said coating providing high surface gloss without calendering.

7. A recording medium as set forth in claim 6 wherein the ink receptive coating includes a cationic fixing agent.

8. A recording medium as set forth in claim 6 wherein the ink receptive coating includes a porosity-enhancing constituent.

9. A recording medium as set forth in claim 1 wherein said porosity enhancing constituent is boric acid and the ink receptive coating further comprises an immobilizer.

10. A recording medium as set forth in claim 9 wherein the ink receptive coating comprises in the order of about 95–96% polyvinyl alcohol, about 2–3% boric acid, about 1% glycosol immobilizer and about 1% conductive polymer cationic fixing agent.

11. A recording medium as set forth in claim 1 wherein said porosity enhancing constituent comprises starch and said ink receptive coating further comprises a cationic pigment.

12. A recording medium as set forth in claim 1 wherein
the binder component of the absorptive coating is present in the ratio of from about 10 to about 25 parts per 100 parts of the pigment component and is comprised of from about 2 to about 6 parts of protein and/or casein, and from about 10 to about 20 parts of latex, starch and/or polyvinyl alcohol, and the absorptive coating is applied to the substrate at a coat weight of from about 3 to about 8 pounds per 3,000 square feet, and
the ink receptive coating is applied over the absorptive coating at a coat weight of from about 2 to about 6 pounds per 3,000 square feet.

13. A recording medium as set forth in claim 1 wherein the absorptive coating has a thickness of at least about 6 microns.

14. A recording medium as set forth in claim 1 wherein the absorptive coating when dry has a thickness of at least about 2 microns per pound per ream of a desired coat weight.

15. An uncalendered, high-gloss ink jet recording medium as in claim 1 wherein said porosity enhancing constituent is selected from the group of boric acid and starch.

16. A high-gloss ink jet recording medium comprising a substrate, an ink vehicle absorptive coating on the substrate and an ink receptive coating overlying the absorptive coating;
the absorptive coating comprising a pigment component and a binder component wherein the pigment component is comprised by weight of from 60 to 100% calcined clay and provides a smooth and level surface;
the receptive coating comprising polyvinyl alcohol, boric acid, an immobilizer and a conductive polymer coated on said smooth and level surface;
said coatings providing high surface gloss without calendering of the coated surface.

* * * * *